Inventor:
PALLE-FINN BEER,
By Pierce + Scheffler,
Attorneys.

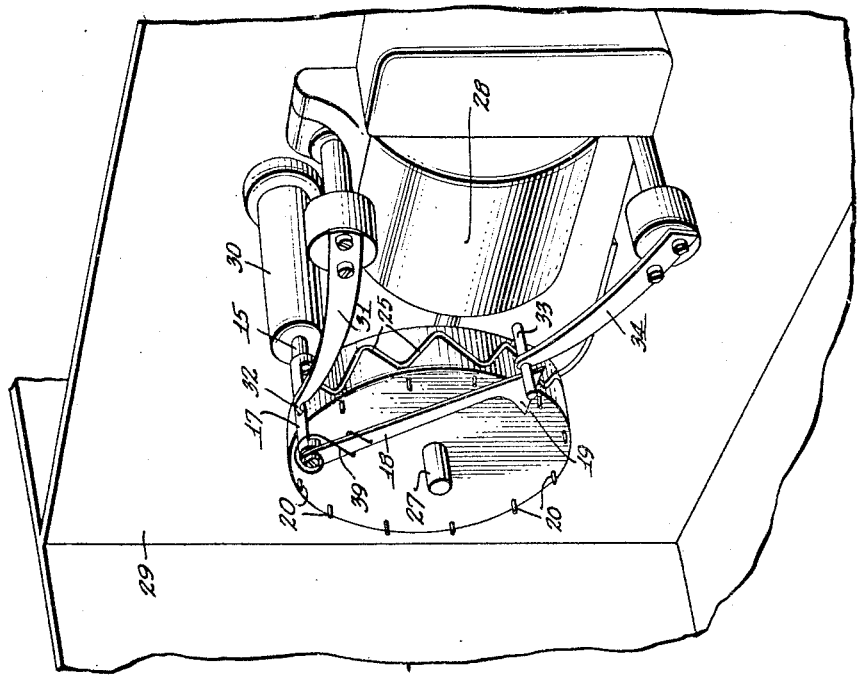

Patented Dec. 22, 1942

2,305,838

UNITED STATES PATENT OFFICE 2,305,838

APPARATUS FOR PROJECTING PICTURE OR SOUND FILMS

Palle-Finn Beer, Copenhagen, Denmark; vested in the Alien Property Custodian

Application October 4, 1940, Serial No. 359,780
In Denmark August 7, 1940

9 Claims. (Cl. 88—16.8)

This invention relates to an apparatus for projecting picture or sound films and more particularly to a portable motion picture apparatus specially adapted to use 16 mm. film and suitable for home and educational use. It involves the provision of an improved projector, means for moving the film at uniform and non-intermittent speed past the picture window, improved means for optically compensating for the said continuous motion of the film so as to produce a steady picture on the screen, and improved means for governing the motion of the components of the said optical means in accordance with the movement of the film.

One object of the invention is to provide an improved apparatus adapted to the reproduction of either silent or sound films of the usual substandard 16 mm. types in commercial use.

Another object of the invention is to provide such an apparatus which is capable of noiseless operation, thereby permitting its operation in any desired location such as the midst of an audience.

Another object of the invention is to provide improved optical means which permit the pictures to be projected with minimum loss of light and without flicker.

Other and ancillary objects of the invention will be apparent from a reading of the following specification in connection with the accompanying drawings wherein:

Fig. 4 is a side view of a part of the apparatus, including the optical system and the film-driving means.

Fig. 5 is a side view of the opposite side of the apparatus, showing details of the governing members adapted to govern the movement of the optical system.

Figure 1:
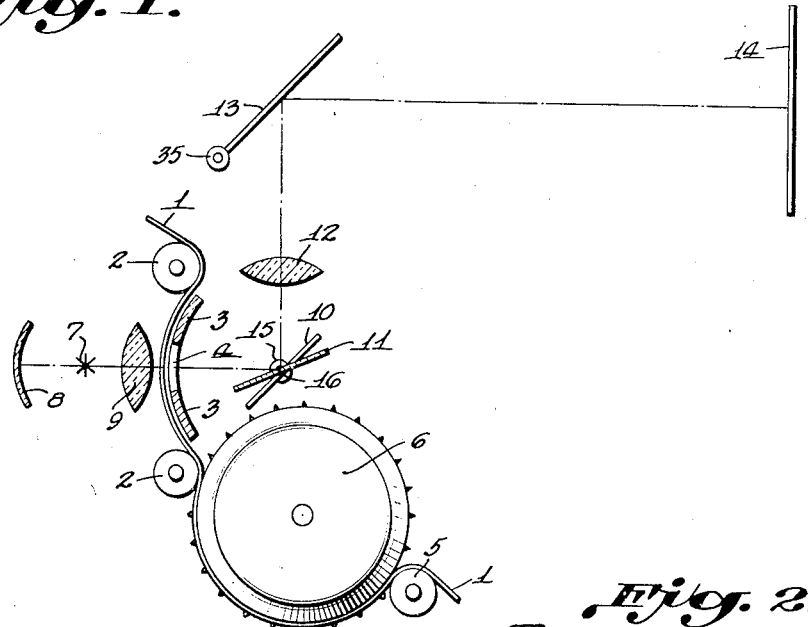
Fig. 1 is a schematic representation of a film-driving means and the optical system embodying the invention.

1 is a film of the conventional 16 mm. width adapted to be moved through the projector at continuous non-intermittent speed. The non-intermittent feed mechanism includes a driving sprocket 6 keyed upon the end of a shaft 27 driven by a driving motor 28, idler rollers 2 and a guiding roller 5 to guide the film through the projector and past the picture window 4 in the cylindrical film guide 3. The length of the film window 4 approximately equals the length of two picture frames.

The optical system comprises a light source 7 arranged at focal length before the concave mirror 8, a condenser lens 9, a pair of mirrors 10 and 11 pivotally mounted on co-axial shafts 15 and 16 respectively, an objective 12, and a mirror 13 adapted to reflect the picture on the screen 14.

Figure 2:
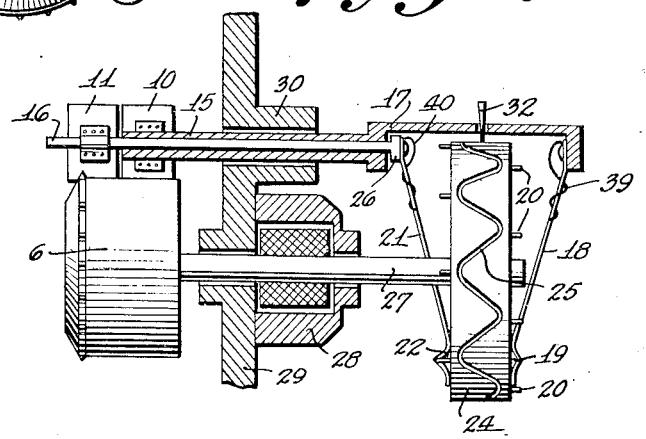
Fig. 2 is a front view, partly in section, of one embodiment of the invention.

Referring to Figs. 2, 4 and 5, the mirror 10 is mounted on a hollow shaft 15 which is journalled in a bushing 30, while the adjacent mirror 11 is mounted on a spindle 16 journalled within the hollow shaft 15, thereby providing for the independent angular movement of the two mirrors. The shaft 15 is slidably mounted in the bushing 30, mounted at the wall 29 so as to permit an axial reciprocating movement of the two mirrors 10 and 11. An extension 17 of the shaft 15 carries at one end an arm 18, actuated by a spring 39, while a similar arm 21 is attached to the end of the spindle 16 and actuated by a spring 40. The end of the spindle 16 is provided with a seat 26, whereby the mirror 11 is bound to follow the axial displacement of the hollow shaft 15. The ends of the arms 18 and 21 are provided with curved extensions 19 and 22 which are adapted to co-operate with pins 20 and 23, arranged at either side of a cylindrical disc 24 mounted at one end of the sprocket shaft 27. The curved extensions 19 and 22 permit the pins 20 and 23 to be moved past the arms 18 and 21 when the disc 24 is rotated in the backwards direction. A guiding curve 25 is grooved in the cylindrical surface of the disc 24 and is adapted to co-operate with a flat member 32, passing through a narrow slit in the extension member 17, thereby imparting a reciprocating movement to the said extension when the said member 32 engages the groove 25 during the rotation of the disc 24. The angular movements of mirrors 10 and 11 are governed by the arms 18 and 21 in the following manner. When the disc 24 is rotated by the driving motor 28 through the shaft 27, the edges of the spring actuated arms 18 and 21 will slide along the pins 20 and 23, whereby the arms and the corresponding shafts will be bound to follow the angular movements of the said pins within a certain angle. When, during the rotation of the disc 24, one of the pins has reached the end of the corresponding arm, e. g. arm 18 shown in Fig. 5, the said arm will be disengaged from the pin and will be shifted back through the action of the spring 39 until it hits the stop 33 mounted on the arm 34. Through this movement which takes place at one of the extreme positions of the member 17, the corresponding mirror 10 will be reset to its initial position, whence the angular movement recommences by the engagement of the arm 18 with the consecutive pin 20. The angular movement of the mirror 11 is governed in exactly the same manner through the arm 21 and the pins 23 at the opposite side of the disc 24. Thus, the said disc 24 with the guiding groove 25 and the pins 20 and 23 effects the simultaneous angular movements of the mirrors 10 and 11 and the lateral reciprocating movement of the said mirrors.

The member 32, engaging the extension 17 and the groove 25, is conveniently arranged at one end of a flat spring 31 attached to the wall 29, the natural frequency of the said spring being tuned to coincide with the frequency of the reciprocating movement of the two mirrors 10 and 11 at normal film-feeding speed, e. g., 24 frames per second.

The function of the angular and reciprocating movements of the two mirrors is briefly as follows: The continuous movement of a frame $a$ of the film 1, passing through the picture window 4, is compensated in a well-known manner by the angular movement of mirror 10. This mirror is at first located entirely within the zone of the projection light beam, and the picture of frame $a$ will therefore be projected on the screen 14 with maximum intensity of light. As frame $a$ moves through the picture window 4 the mirror 10 is simultaneously moved sidewards, whereby a steadily decreasing portion of its surface reflects the projection light on the screen. Thus, the intensity of the screen picture originating from frame $a$ gradually decreases as this frame moves down through the picture window. At the same time, however, the consecutive frame $b$ is moving into the picture window 4, and the continuous movement of this frame is similarly compensated by the angular movement of mirror 11 which, at the same time, gradually moves sidewards into the projection light. Thereby a steadily increasing portion of its surface is caused to reflect the light from frame $b$ on the screen 14, thus causing the intensity of the projected image of frame $b$ to increase in the same proportion as the intensity of the projected image from frame $a$ decreases.

The combined optical effect of the two mirrors, therefore, will be to create a steady motion picture having a constant and maximum intensity and being produced by the fusion of the projected images of frames $a$ and $b$.

When the mirror 10 has been moved entirely out of the zone of the projection light, the mirror 11 which is coordinated with frame $b$, will take over the entire amount of light projected on the screen 14. At this position of the two mirrors, mirror 10 will be instantaneously shifted back to its initial position through the action of the spring 39, whereupon it recommences its backward movement into the zone of the projection light, whilst simultaneously compensating the continuous movement of the consecutive frame $a$, now appearing in the picture window. At the same time, mirror 10 will take over a steadily increasing amount of the light reflected on the screen. Mirror 11 is now moving out of the zone of the projection light, and when it reaches its extreme position outside of the projection light, it is again shifted back through the action of the spring 40, whereupon the cycle of movements recommences.

Figure 3:
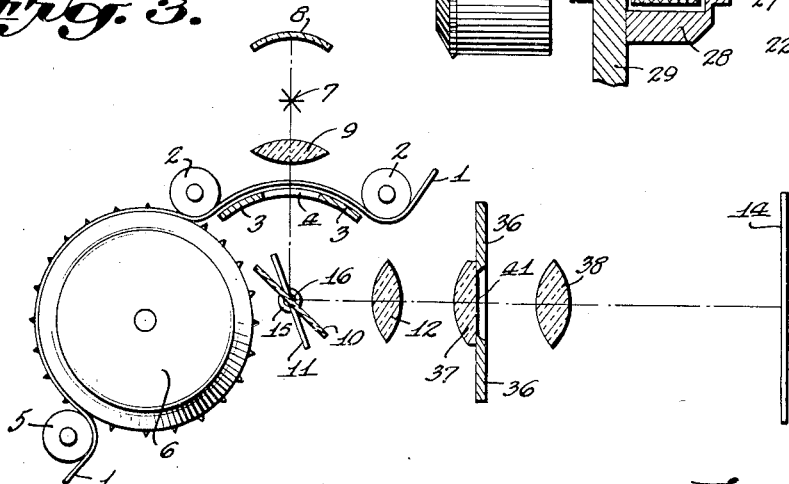
Fig. 3 is a schematic representation of a modified embodiment of the optical system.

Referring to Fig. 3, the embodiment shown therein comprises a mask 36 provided with an aperture 41 and a cylindrical lens 37 adjacent thereto. The objective 12 projects an image of the film frames moving at continuous speed through the picture window 4 at the aperture 41. The slight optical distortion of this image is compensated for by the cylindrical lens 37, and the optically corrected image is masked off by the mask 36 and thereupon projected on the screen 14 by a second objective 38.

I claim:

1. An apparatus for projecting motion pictures comprising a non-intermittent film-feeding device including a driving sprocket on a sprocket shaft for moving the film at a constant speed through a picture window, a hollow shaft pivotally mounted at one side of the apparatus and adapted to be moved reciprocatingly in the direction of its axis, a mirror attached to the said hollow shaft, a second shaft journalled within said hollow shaft and a second mirror attached thereto adjacent to the first mirror, spring actuated arms attached to the said shafts, a disc mounted at one end of the sprocket shaft, a plurality of projections at either side of the said disc and cooperating with the said arms to impart an angular movement to the two mirrors, and means for imparting a reciprocating movement to the said two shafts.

2. An apparatus for projecting motion pictures comprising a non-intermittent film-feeding device including a driving sprocket on a sprocket shaft for moving the film at a constant speed through a picture window of cylindrical form, a hollow shaft pivotally mounted close to the axis of the said cylindrical window and adapted to be moved reciprocatingly in the direction of its axis, a mirror attached to the said hollow shaft, a second shaft journalled within said hollow shaft and a second mirror attached thereto adjacent to the first mirror, spring actuated arms attached to the ends of said shafts, a disc mounted at one end of the sprocket shaft, a plurality of projections at either side of the said disc and cooperating with the said arms to impart an angular movement to the two mirrors, and means for imparting a reciprocating movement to the said two shafts.

3. An apparatus for projecting motion pictures comprising a non-intermittent film-feeding device including a driving sprocket on a sprocket shaft for moving the film at a constant speed through a picture window of cylindrical form, two concentric shafts rotationally mounted close to the axis of said cylindrical window and adapted to be moved reciprocatingly in the direction of their axis, two mirrors attached to the respective shafts adjacent to one another, spring actuated arms attached to said shafts, a disc mounted at one end of the sprocket shaft, a plurality of projections at opposite sides of the said disc to cooperate with the said arms to impart an angular movement to the two mirrors, and means for imparting a reciprocating movement to the said two shafts.

4. An apparatus for projecting motion pictures comprising a non-intermittent film-feeding device including a driving sprocket on a sprocket shaft for moving the film at a constant speed through a picture window, a hollow shaft pivotally mounted at one side of the apparatus and adapted to be moved reciprocatingly in the direction of its axis, an extension of the said hollow shaft at the opposite end of the apparatus, a spring actuated arm attached to the end of the said extension of the said hollow shaft, a mirror attached to the said hollow shaft adjacent one end thereof, a spindle journalled within the said hollow shaft, a spring actuated arm attached at one end of the said spindle, a second mirror upon the said spindle at the opposite end thereof, a disc mounted at one end of the sprocket shaft, a plurality of projections at opposite sides of the said disc to cooperate with the said arms, and means for imparting a reciprocating movement to the said extension of the said hollow shaft.

5. An apparatus for projecting motion pictures comprising a non-intermittent film-feeding device including a driving sprocket on a sprocket shaft for moving the film at a constant speed through a picture window of cylindrical form, two concentric shafts rotationally mounted close to the axis of said cylindrical window and adapted to be moved reciprocatingly in the direction of their axis, two mirrors attached to the respective shafts adjacent to one another, spring actuated arms attached to the said shafts, a disc mounted at one end of the sprocket shaft, a plurality of projections at opposite sides of the said disc to cooperate with the said arms to impart an angular movement to the two mirrors, a guiding curve grooved in the cylindrical surface of the said disc, and a pin coupled to one of the said two shafts and engaging the said groove in the said disc to impart a reciprocating movement to the said two shafts.

6. An apparatus for projecting motion pictures comprising a non-intermittent film-feeding device including a driving sprocket on a sprocket shaft for moving the film at a constant speed through a picture window, a hollow shaft pivotally mounted at one side of the apparatus and adapted to be moved reciprocatingly in the direction of its axis, an extension of the said hollow shaft, a spring actuated arm attached to the end of the said extension of the said hollow shaft, a mirror attached to the said hollow shaft adjacent one end thereof, a spindle journalled within the said hollow shaft, a spring actuated arm attached at one end of the said spindle, a second mirror upon the said spindle, a disc mounted at one end of the sprocket shaft, a plurality of projections at opposite sides of the said disc to cooperate with the said arms, a guiding curve grooved in the cylindrical surface of the said disc, and a member projecting through a slit in the said extension of the said hollow shaft and engaging the said groove in the said disc to impart a reciprocating movement to the said extension of the said hollow shaft.

7. In an apparatus for projecting motion pictures, a governing member for imparting angular and reciprocating movements to a pair of mirrors mounted on co-axial shafts, said member comprising a cylindrical rotatable disc provided with projections peripherally disposed at opposite faces thereof and adapted to cooperate with spring actuated arms attached to the said co-axial shafts to impart angular movement to the said shafts, a guiding groove in the cylindrical surface of the said disc, a member coupled to one of the said shafts and engaging the said groove to impart reciprocating movement to the said shafts.

8. In an apparatus for projecting motion pictures, a governing member for imparting angular reciprocating movements to a pair of mirrors mounted on co-axial shafts, said member comprising a cylindrical rotatable disc provided with projections peripherally disposed at opposite faces thereof to cooperate with spring actuated arms projecting from each of the said co-axial shafts to impart angular movements to the said co-axial shafts, a groove in the cylindrical surface of the said disc, a flat spring projecting at one end through a slit in an extension of one of the said co-axial shafts and engaged in the said groove in the said disc.

9. In an apparatus for projecting motion pictures, the invention as defined in claim 7, wherein the common axis of the said co-axial shafts is located adjacent the periphery of the said rotatable disc to provide for the angular movement of the said arms on the said co-axial shafts substantially equal to one half of the angular movement of the said rotatable disc.

PALLE-FINN BEER.